3,291,964
IMMERSION HEATER STEAM BOILERS

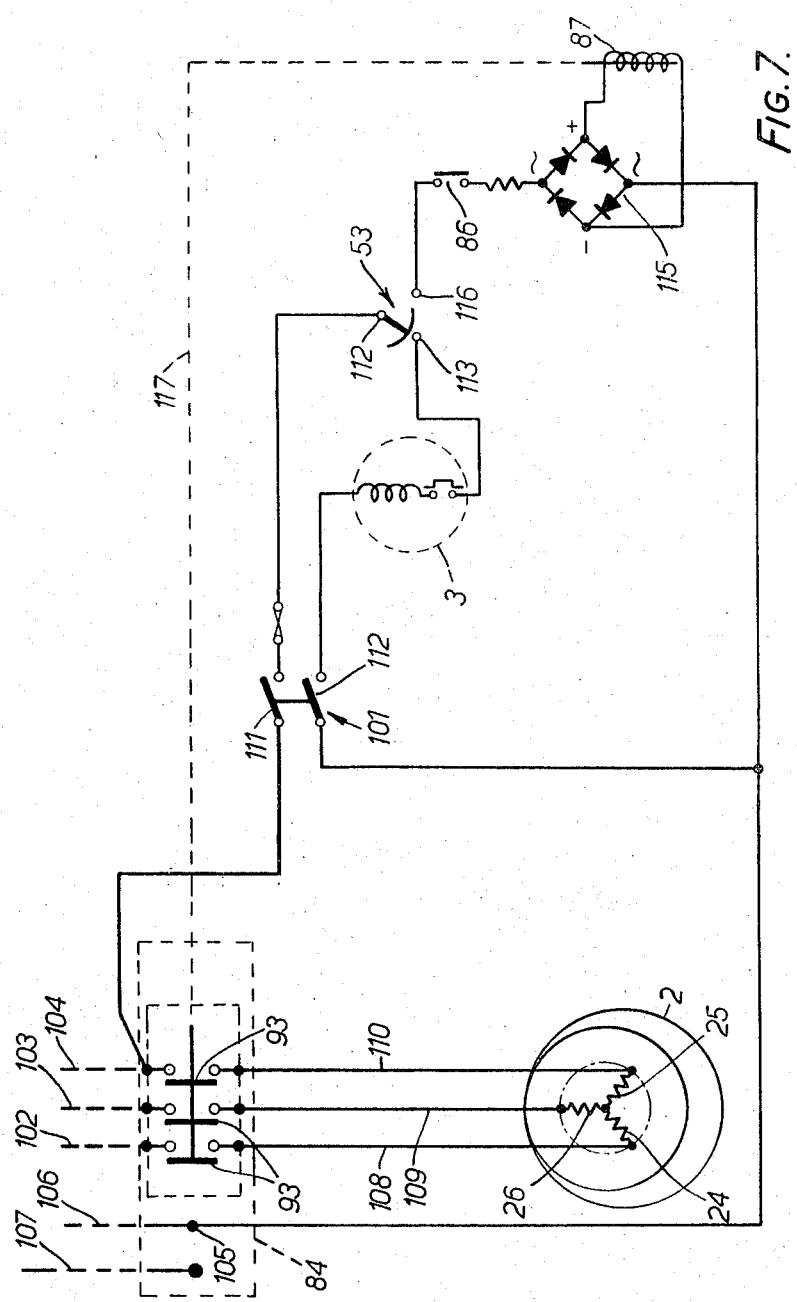

Gerald A. Williams, Croxley Green, England, assignor to Bastian and Allen Limited, Harrow, England, a corporation of Great Britain
Filed May 4, 1964, Ser. No. 364,684
Claims priority, application Great Britain, May 7, 1963, 18,005/63
2 Claims. (Cl. 219—271)

This invention relates to steam boilers for the generation of steam under pressure and of the kind in which the water is heated by insulated electrical heating elements which are immersed in the water in the boiler.

Two forms of boilers of this kind have been employed. The first kind has a boiler shell consisting of a horizontal cylinder with the heating elements supported from one end of the cylinder and with a float switch for water level control supported from the other end of the cylinder. A disadvantage of this arrangement is that it is difficult to obtain a sufficient vertical distance between the water surface and the steam outlet to obtain dry steam without the water surface being so low as to waste a large part of the space within the boiler shell. To overcome this problem a steam dome is sometimes employed but the dome has to be welded on to the cylindrical wall of the shell around a relatively large aperture formed in the cylindrical wall and this is undesirable. Another disadvantage of the horizontal arrangement is the difficulty of removing scale flakings which build up on the heating elements and then drop to the bottom of the boiler. The other known form utilizes a vertical cylinder of comparatively large diameter with horizontal heating elements in the lower portion. With this arrangement it is necessary to provide openings for the heating elements through the cylindrical wall of the shell. Moreover, large diameter cylinders are expensive.

According to the present invention, a steam boiler of the kind in which the water is heated by one or more insulated electrical heating elements which are immersed in the water of the boiler has a boiler shell having a cylindrical wall whose longitudinal axis is inclined to the vertical and to the horizontal. The angle between the axis and the vertical may be between 20° and 60°, the preferred range being between 25° and 35° and the particularly preferred angle being approximately 30°.

A number of advantages follow from the tilted arrangement of the boiler. Firstly the space above the water between the cylindrical side wall of the boiler and the top end wall of the boiler forms a convenient steam collecting space and the steam outlet may be positioned in the top end wall, which is preferably generally flat and in a plane perpendicular to the longitudinal axis of the cylindrical wall, adjacent the highest point of the cylindrical side wall and this arrangement does not necessitate the formation of an aperture in the cylindrical side wall. Similarly, the combination of the cylindrical side wall and the bottom end wall of the boiler, which is preferably generally flat and in a plane perpendicular to the longitudinal axis of the cylindrical wall, form hopper-like surfaces which guide scale flakes dropped from the heating elements towards the lowest part of the boiler and a blow-down aperture may be provided in the bottom end wall adjacent the lowest part of the cylindrical wall, again without the necessity of providing an aperture in the cylindrical wall. The, or each heating element may be supported from either the top or the bottom end wall of the boiler, preferably the top end wall, and again no aperture need be formed in the cylindrical wall. If a float switch to control the water level of the boiler is employed it may be necessary to provide an aperture through the cylindrical wall for this. If a float switch is employed it preferably extends through the higher side of the cylindrical wall and in a preferred construction there is a baffle in the boiler shell between the float of the float switch and the heating element or elements, the baffle extending across the boiler shell in a plane parallel with the longitudinal axis of the cylindrical wall from near the bottom of the boiler to above the normal water lever in the boiler.

The invention also extends, according to another aspect, to a steam generation unit comprising a framework on which is mounted a steam boiler arranged in accordance with any of the earlier aspects of the invention described above. Thus, for example, the steam generation unit may constitute a self-contained assembly, the framework also carrying a feed pump and a boiler control system.

The invention may be carried into practice in various ways but one steam generation unit embodying the invention will now be described by way of example with reference to the accompanying drawings, in which:

FIGURE 7 is a wiring diagram for the unit.

Figure 1:
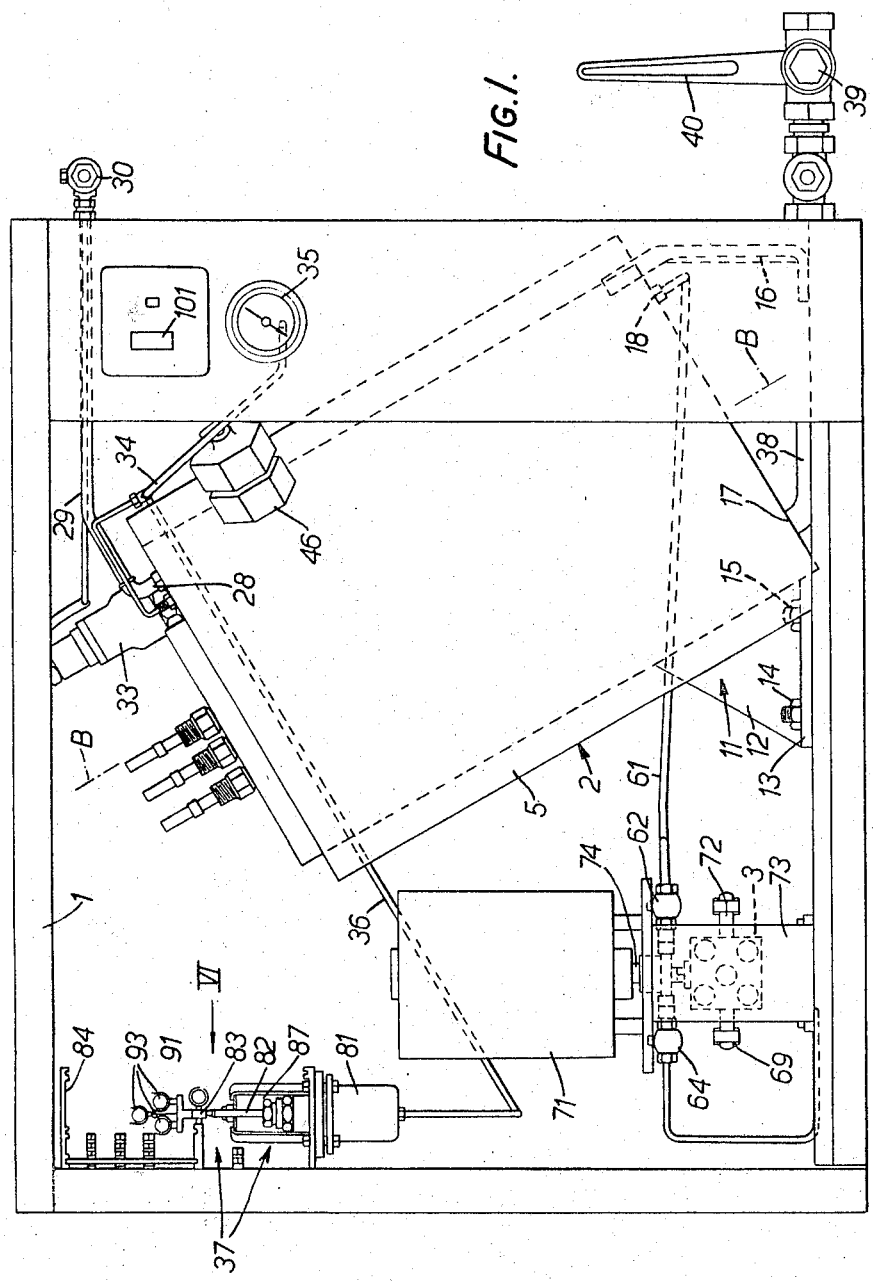
FIGURE 1 is a front elevation of the unit with the door removed to show the contents of the unit.
Figure 2:
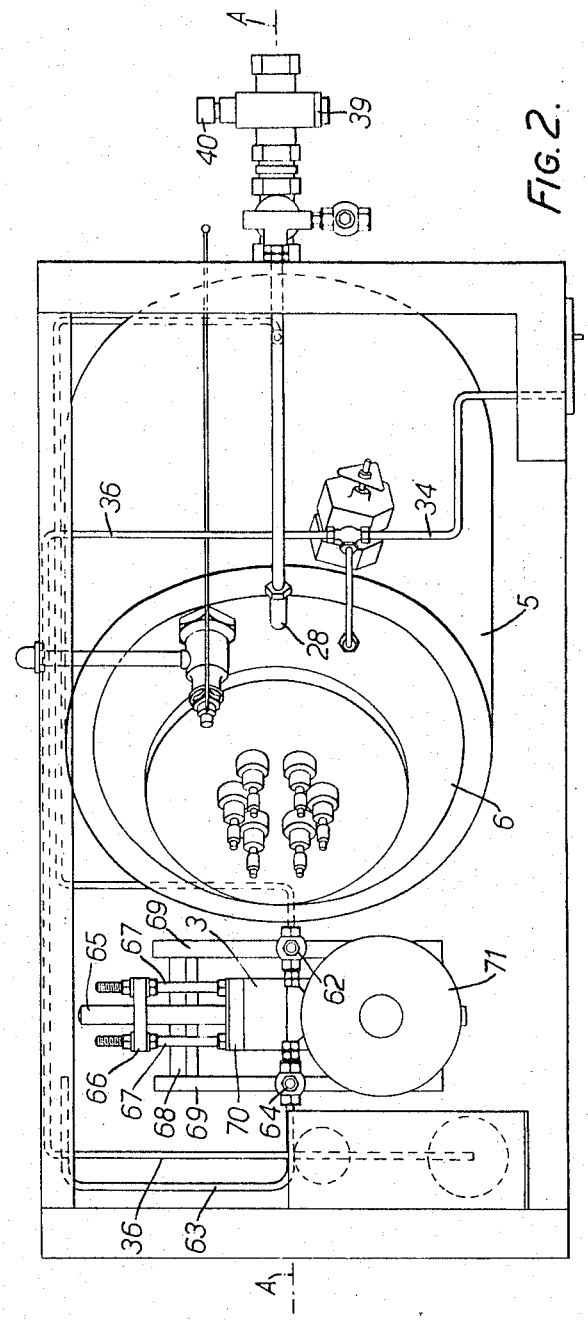
FIGURE 2 is a plan view of the unit with the door and the top panel removed.

Referring now to the drawings, the unit constitutes a self-contained package comprising a parallelepiped-shaped framework 1 which is enclosed by sheet metal panels on three sides and the top and which is enclosed on the fourth side by a removable door giving access to the interior as seen in FIGURE 1 and by a control panel 4. The framework supports the boiler 2, the feed pump 3 and various control mechanisms which will be described.

The boiler has a cylindrical side wall 5 which is closed at the upper end by a disc 6 forming a top end wall and is closed at the bottom end by a disc 7 forming a bottom end wall. The discs are welded to the cylindrical side wall by welds 8 and 9 respectively shown in FIGURE 4. As can be seen in FIGURE 1, the longitudinal axis of the cylindrical wall is tilted at an angle of 30° to the vertical. The vertical plane A—A containing the tilted axis will be referred to as the tilt plane and the plane B—B containing the tilt axis and normal to the tilt plane will be referred to as the transverse plane. Because the boiler is tilted one side of it will be generally higher than the other side and various references will be made to the higher and lower sides of the boiler.

The boiler is supported at the bottom of the lower side by a bracket 11 which is formed by a plate 12 which lies in the tilt plane and which is in the form of an equilateral triangle and a cross plate 13 which is bolted to the frame by bolts 14 and 15, one edge of the plate 12 being welded to the cylindrical wall of the boiler and another edge being welded to the cross plate 13. There is also a vertical leg 16 one end of which is welded to the bottom of the higher side of the cylindrical wall of the boiler and the other end of which is bolted to the framework 1.

Figures 3, 4, 5:
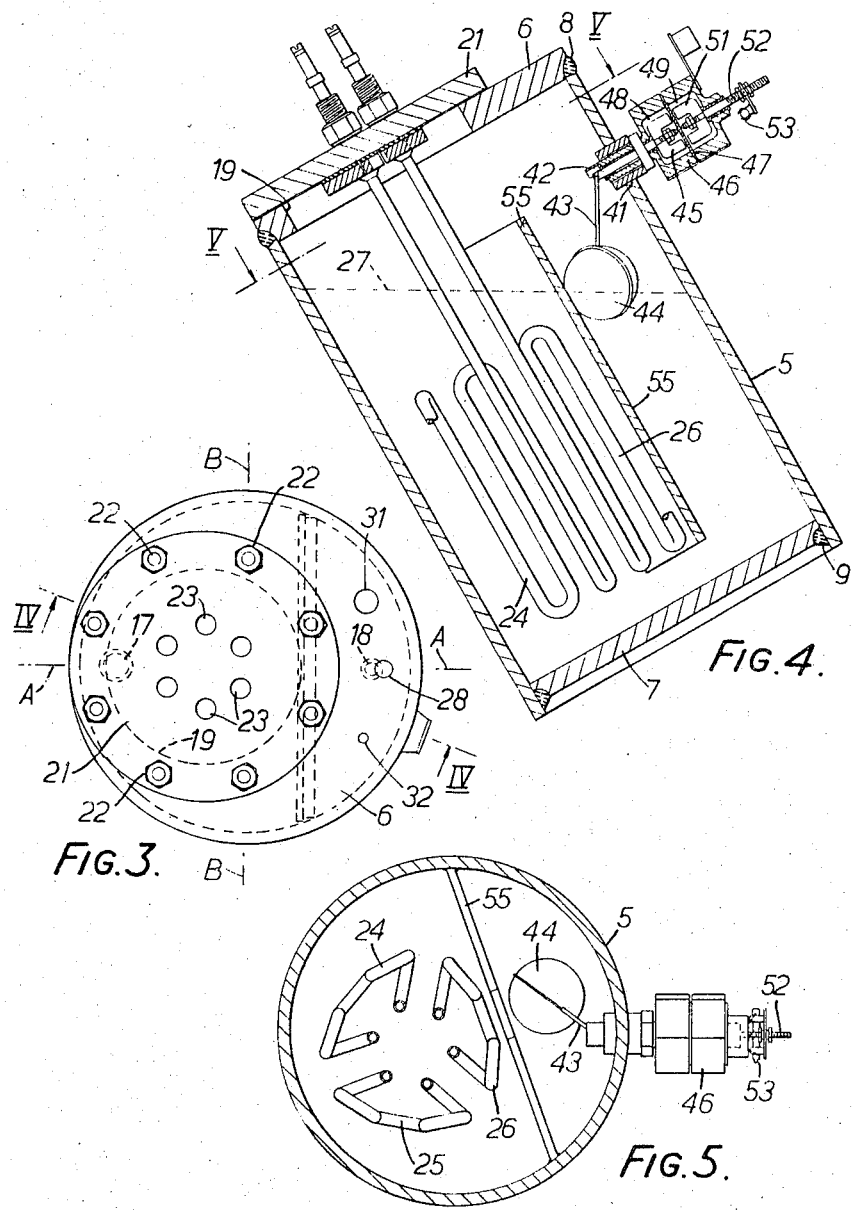
FIGURE 3 is a top end elevation of the boiler with the top cover removed.
FIGURE 4 is a longitudinal section through the boiler on the line IV—IV of FIGURE 3 and to a larger scale.
FIGURE 5 is a transverse section through the boiler on the line V—V of FIGURE 4.

As can be seen from FIGURES 1 and 3, the bottom end wall 7 of the boiler has two holes 17 and 18 drilled through it, the axes of both holes lying in the tilt plane, one hole being near the lower edge and the other hole being near the higher edge of the bottom end wall. The upper hole 18 is that through which feed water is supplied to the boiler while the lower hole 17 constitutes the blow-down aperture and is connected to a pipe 38 which terminates in a blow-down valve 39 which is outside the framework 1 and is controlled by a handle 40. Scale formed in the boiler will fall on the inner surface of the lower side of the cylindrical wall 5 and on to the upper surface of the bottom end wall 7. Cold water coming into the boiler through the feed water inlet 18 will tend to run down the upper surface of the bottom end wall 7, thus carrying the scale towards the blowdown aperture where it will collect. Periodically the scale can be blown through the aperture 17 by opening the valve 39.

The top end wall of the boiler has a large circular aperture 19, whose diameter is half the diameter of the top end wall 6. The axis of this aperture lies in the tilt plane but is displaced from the axis of the cylindrical wall towards the lower side of the boiler. This aperture is covered by a top cover 21 which is fastened to the top end wall by nuts 22 which are screwed on to eight studs 20 which are screwed into threaded apertures around the circular aperture 19. The top cover has six holes 23 extending through it equally spaced around a centrally positioned pitch circle. These holes through the top cover support three electric heating elements 24, 25 and 26, each end of each element passing through one of the holes 23. The heating elements are looped and extend downwardly to near the bottom of the boiler. The elements are so constructed that only those parts which are below the normal water level 27 during operation generate heat, the parts above the water merely constituting electrical leads to the heating parts. Extending through the top end wall is a small hole 28 whose axis lies in the tilt plane and which is adjacent the upper edge of the top end wall. This hole is connected to the live steam delivery pipe 29 which terminates in a valve 30 to which the steam-consuming device can be connected. It will be appreciated that the hole 28 through which live steam leaves the boiler shell is almost at the highest point within the boiler shell. There are two other holes 31 and 32 extending through the top end wall, these holes lying on the same pitch circle as the hole 28 forming the live steam outlet and lying on radii displaced by 30° on either side of the radius on which the hole 28 lies. The hole 31 accommodates a safety valve 33 while the hole 32 is connected by piping 34 to a pressure gauge 35 on the control panel 4. The hole 32 is also connected by piping 36 to the control system 37 which will be described in detail below.

The only hole extending through the cylindrical wall 5 of the boiler is a hole 41 towards the upper end and lying on a radius displaced by about 20° from the tilt plane. Extending through this hole is the shaft 42 of the float switch which is used to control the feed water supply to the boiler to maintain a substantially constant water level. Rigidly fixed to one end of the shaft 42 is an arm 43 carrying a float 44 while a magnet 45 is fixed to the other end. The magnet 45 is contained in a housing 46 which is divided by a non-magnetic pressure seal member 47 into two chambers 48 and 49. The chamber 49 contains a magnet 51 which is similar to the magnet 45 and is mounted on a shaft 52. As the magnet 45 rotates in response to changes in water level in the boiler sensed by the float 44 it draws the magnet 51 with it. This arrangement constitutes a pressure seal, the chamber 48 being substantially at the pressure of the interior of the boiler shell and the chamber 49 being at atmospheric pressure. Fixed to the shaft 52 is a three-contact mercury switch 53.

To avoid the float switch being affected by turbulence caused by steam generation around the elements 24, 25 and 26 a baffle 55 extends from side to side of the cylindrical side wall 5 parallel with the transverse plane B—B and displaced from the transverse plane towards the upper side of the boiler. The baffle 55 extends from near the bottom of the boiler to a point above the maximum water level as determined by the float switch with the elements 24, 25, 26 on one side of the baffle and the float switch on the other.

The boiler is supplied with feed water through the hole 18 in the bottom end wall 7 by the feed pump 3 through a pipe 61. The feed pump comprises a pumping chamber (not shown in the drawings) which is in communication with the pipe 61 through a non-return valve 62 and with a feed water supply pipe 63 through a non-return valve 64. One end of a plunger or ram 65 extends into the pumping chamber, the other end of the plunger being supported in a bearing provided by a plate 66 supported from the body of the pump by four studs 67 which also serve to tighten a pump gland 70. The plunger carries a cross member 68 which is connected to the outer ends of a pair of connecting rods 69, the other ends of which are connected to eccentrically mounted bearings on the horizontal output shaft 72 of a gear box 73, the vertical input shaft 74 of which is driven by an electric motor 71 whose axis is vertical.

Figure 6:
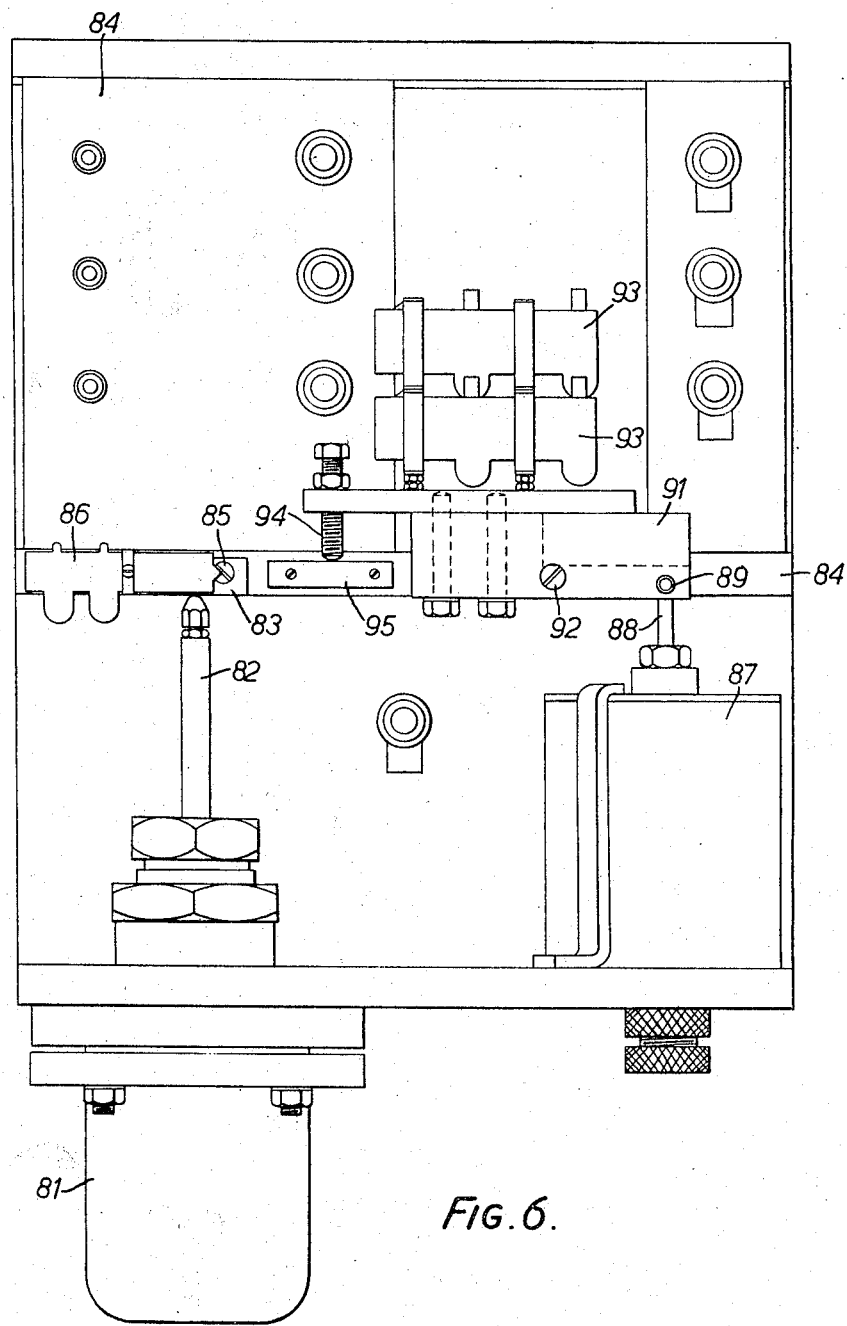
FIGURE 6 is a detailed elevational view of the control system of the unit taken in the direction of the arrow VI in FIGURE 1.

The boiler is controlled by the control apparatus shown in FIGURE 6. This comprises a bellows chamber 81 containing a bellows which is in communication through the piping 36 with the interior of the boiler shell and is thus responsive to boiler pressure. The bellows actuates a reciprocating rod 82 which acts on a beam 83 pivoted by a screw 85 on the end of the central leg of an E-shaped framework 84 fixed to the framework 1. The beam 83 carries a two-contact mercury switch 86. The control system also includes a contactor coil 87 which operates a reciprocating rod 88 which is pivoted at 89 to a second beam 91 pivoted by a screw 92 on the end of the central leg of the framework 84. Pivotal movement of the beam 91 in one direction is limited by an adjustable screw 94 which engages a fixed stop 95. The beam 91 carries three two-contact mercury switches 93. The elements 24, 25, 26 are arranged for three phase operation and each mercury switch controls one phase.

FIGURE 7 is a simplified circuit diagram of the apparatus. The three mercury switches 93 are shown mounted on the support framework 84 and connected by leads 102, 103, 104 to a three phase electricity supply and a neutral terminal 105 is connected to the neutral line of the supply by a lead 106. The framework 84 is earthed by a lead 107. The mercury switches are connected to the heating elements 24, 25, 26 of the boiler 2 by leads 108, 109, 110. The pump 3 is in a circuit containing one pole 111 of an on/off switch 101 located on the control panel 4 and two contacts 112 and 113 of the float-controlled three-contact mercury switch 53 and the other pole 114 of the switch 101. The contactor coil 87 is fed from a rectifier ring 115 in a circuit containing the pole 111 of the switch 101, the contact 112 and the third contact 116 of the float-controlled mercury switch 53 and the pressure controlled mercury switch 93. The operative connection between the rod 88 controlled by the contactor coil 87 and the mercury switches 93 is indicated by the dashed line 117.

Operation of the boiler is as follows. When there is little or no water in the boiler, the float-controlled mercury switch 53 adopts a position in which a connection is made between the contacts 112, 113 in the circuit of the feed pump motor 71 so that when the on/off manually operated switch 101 on the control panel 4 is switched on water is fed into the boiler through the hole 18 in the bottom end wall 7. When the water level reaches a predetermined high level the mercury switch 53 is tilted sufficiently for the mercury to leave the contact 113 so that the circuit of the motor 71 is broken and feed stops. When the water level in the boiler falls to a predetermined low level the mercury again engages the contact 113 to restore the motor circuit and water is again fed to the boiler until the high level is again reached. This intermittent operation of the motor 71 continues while the boiler is in operation.

Primary control of the contactor coil is by the mercury switch 86 which is controlled by the pressure sensitive bellows in the bellows chamber 81. The contactor coil and the bellows are so arranged that, when the pressure in the boiler is below a certain level, current is supplied through the mercury switch 86 to energise the contactor coil so that the rod 82 tilts the beam 91 so that current is supplied through the mercury switches 93 to the elements. When the pressure in the boiler rises to another slightly higher level the mercury switch 86 is tilted to break the circuit to the contactor coil which is de-energised so that the mercury switches 93 break the supply of current to the elements. The third contact 116 of the float-controlled mercury switch 53 assists in the control of the contactor coil 87 and ensures that current is not supplied to the heating elements until a minimum water level (below the predetermined low level referred to above) is attained. If, during operation, the water level in the boiler should fall to this level, for example due to failure of the feed pump or accidental operation of the blow-down valve, mercury will leave the contact 116 so that the contactor coil will be de-energised to break the supply of current to the elements.

What I claim as my invention and desire to secure by Letters Patent is:

1. A steam generation plant comprising support means, a boiler shell including a cylindrical side wall, a flat upper disc and a flat lower disc closing the ends of the cylindrical side wall and electrical heater elements supported from said shell inside said shell, said boiler shell being mounted on said support means with the longitudinal axis of said cylindrical side wall inclined to the vertical by an angle of between 20° and 60°, a live steam delivery passage opening into the boiler shell through said upper disc adjacent the upper edge of said upper disc, and a blow-down delivery passage opening into the boiler shell through said lower disc adjacent the lower edge of said lower disc.

2. A steam generation plant according to claim 1 including a feed water supply pipe opening into the boiler shell through said lower disc adjacent the upper edge of said lower disc.

References Cited by the Examiner

UNITED STATES PATENTS

| | | | |
|---|---|---|---|
| 1,006,197 | 10/1911 | Frasch | 122—379 X |
| 1,223,674 | 4/1917 | Dearing | 219—310 X |
| 1,667,758 | 5/1928 | Welter | 219—316 |
| 1,983,043 | 12/1934 | Martin | 219—324 X |
| 2,623,153 | 12/1952 | McGinnis | 219—333 |

RICHARD M. WOOD, *Primary Examiner.*

ANTHONY BARTIS, *Examiner.*

C. L. ALBRITTON, *Assistant Examiner.*